(12) United States Patent
Barnett

(10) Patent No.: US 6,521,858 B1
(45) Date of Patent: Feb. 18, 2003

(54) PLASMA ENHANCED PLATE BONDING METHOD AND DEVICE

(75) Inventor: Ronald J. Barnett, Santa Rosa, CA (US)

(73) Assignee: GeoMat Insights, LLC, Santa Rosa, CA (US)

( * ) Notice: Subject to any disclaimer, the term of this patent is extended or adjusted under 35 U.S.C. 154(b) by 0 days.

(21) Appl. No.: 09/996,036

(22) Filed: Nov. 19, 2001

(51) Int. Cl.⁷ ................................................ B23K 10/00
(52) U.S. Cl. ............................ 219/121.46; 219/121.45; 219/121.52; 156/272.2
(58) Field of Search ................ 219/121.59, 121.52, 219/121.37, 121.45, 121.46; 156/272.2, 244.22, 244.23, 244.24, 282, 275.3, 275.5, 275.7

(56) References Cited

U.S. PATENT DOCUMENTS

| | | | | |
|---|---|---|---|---|
| 3,703,623 A | * | 11/1972 | Swengel, Sr. | 219/137 |
| 5,110,387 A | * | 5/1992 | Jasinski et al. | 156/222 |
| 5,913,999 A | * | 6/1999 | Hayashida et al. | 156/272.2 |
| 6,146,480 A | * | 11/2000 | Centanni et al. | 156/151 |

\* cited by examiner

*Primary Examiner*—Mark Paschall
(74) *Attorney, Agent, or Firm*—Law Offices of Jessica Costa, PC; Jessica Costa

(57) ABSTRACT

A method and apparatus for bonding solid plates together is presented. A modulated directional flow of plasma is applied at and between the bonding surfaces of the plates to be bonded prior to and during the application of pressure to compress the bonding surfaces together to form a direct contact or diffusion bond.

20 Claims, 8 Drawing Sheets

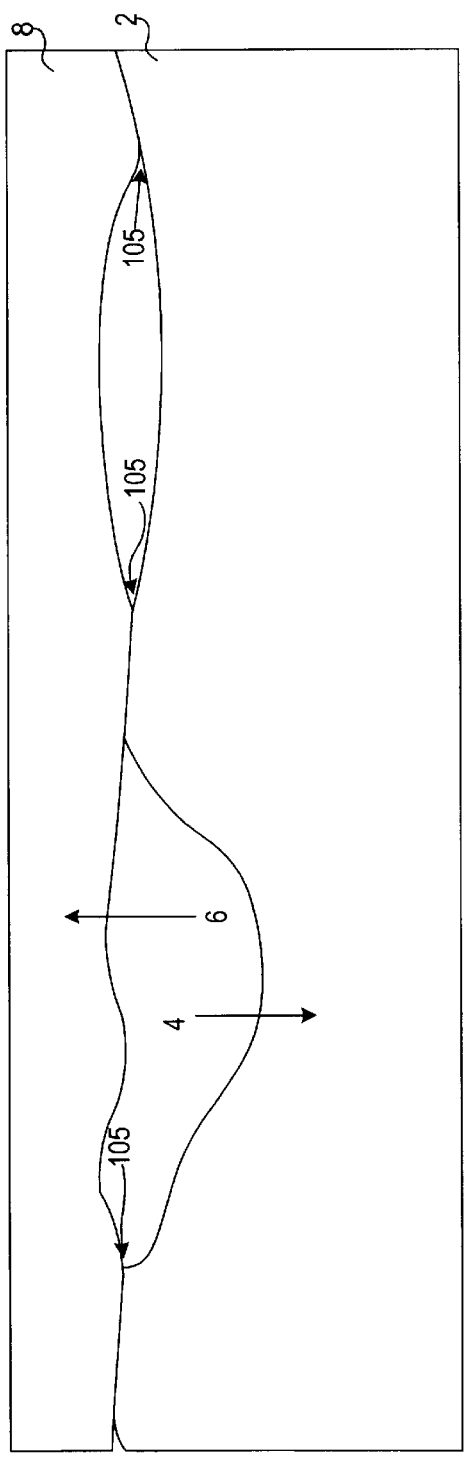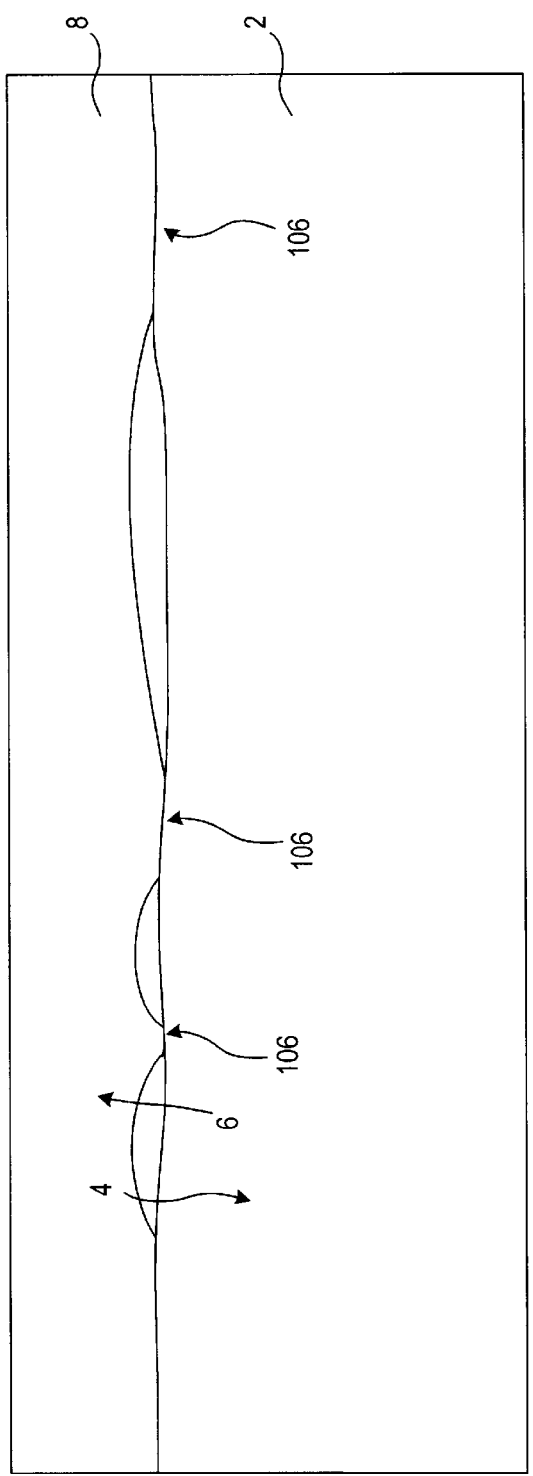

PLASMA ENHANCED PLATE BONDING METHOD AND DEVICE

CROSS-REFERENCE TO RELATED APPLICATIONS

This application is related to applications as follows: U.S. application Ser. No. UNKNOWN, entitled PLASMA ENHANCED COMPONENT ATTACH METHOD AND DEVICE, U.S. application Ser. No. UNKNOWN, entitled PLASMA ENHANCED CIRCUIT PACKAGING METHOD AND DEVICE, U.S. application Ser. No. UNKNOWN, entitled PLASMA ENHANCED METAL PLATE BONDING METHOD AND DEVICE, all filed herewith, and U.S. Pat. No. 6,320,155, entitled PLASMA ENHANCED WIRE BONDER, issued Nov. 20, 2001, each of which is incorporated by reference for all that they teach.

FIELD OF THE INVENTION

The present invention pertains generally to material bonding, and more particularly, to a method and apparatus for using hot plasma gas to simultaneously heat, clean, and activate the bonding surfaces of bondable plates before and during bonding of the plates together.

BACKGROUND OF THE INVENTION

Various techniques exist for bonding materials together. For materials comprising metals, bonding techniques include welding, brazing, soldering, and more recently, direct contact and diffusion bonding. For materials comprising non-metal solids, bonding techniques typically include using some type of adhesive such as an epoxy.

Welding is a metal joining process wherein coalescence is produced by heating the metal to suitable temperatures, with or without the application of pressure and with or without the use of filler metals. Coalescence is a growing together into one body. A weld is the junction of plates or the edges of plates which are to be joined or have been joined by melting and refreezing at the contact interfaces of plates themselves. Filler metal is the material to be added in making a welded, brazed, or soldered joint. Base metal is the material to be welded, soldered, or cut.

The term arc welding applies to a large and varied group of processes that use an electric arc as the source of heat to melt and join metals together as the molten metal re-freezes. In arc welding processes, the joining of metals, or weld, is produced by the extreme heat of an electric arc drawn between an electrode and the work-piece, or between two electrodes. The formation of a joint between metals being arc welded may or may not require the use of pressure or filler metal. The arc is struck between the workpiece and an electrode that is mechanically or manually moved along the joint, or that remains stationary while the workpiece is moved underneath it. The electrode is either a consumable wire rod or a nonconsumable carbon or tungsten rod which carries the current and sustains the electric arc between its tip and the workpiece. When a nonconsumable electrode is used, a separate rod or wire can supply filler material, if needed. A consumable electrode is specially prepared so that it not only conducts the current and sustains the arc, but also melts and supplies filler metal to the joint, and may produce a slag covering as well.

Gas welding processes are a group of welding processes in which a weld is made by heating with a gas flame. Pressure and/or filler metal may or may not be used. Also referred to as oxyfuel gas welding, the term gas welding is used to describe any welding process that uses a fuel gas combined with oxygen, or in rare cases, with air (20% Oxygen), to produce a flame having sufficient energy to melt the base metal. The fuel gas and oxygen are mixed in the proper proportions in a chamber, which is generally a part of the welding tip assembly. The torch is designed to give the welder complete control of the welding flare, allowing the welder to regulate the melting of the base metal and the filler metal. The molten metal from the work-piece edges and the filler metal intermix in a common molten pool and join upon cooling to form one continuous piece.

Brazing and soldering are welding processes in which materials are joined by heating to a suitable temperature and by using a filler metal with a melting point below that of the base metal. The filler metal is distributed to the closely fitted surfaces of the joint by capillary action.

Resistance welding consists of a group of processes in which the heat for welding is generated by the resistance to the electrical current flow through the parts being joined, using pressure. It is commonly used to weld two overlapping sheets or plates which may have different thicknesses. A pair of low resistance electrodes conducts electrical current through the sheets, forming a weld. The Key aspect of the resistance weld is that most of the resistance in the welding circuit is in the contact resistance where the metals are pressed together, so that most of the (I^2*R) heat is formed at the surfaces that are to be welded together.

The properties of a welded joint depend partly on the correct preparation of the edges being welded. Cleanliness is of key concern. All mill scale, rust, oxides, and other impurities must be removed from the joint edges or surfaces to prevent their inclusion in the weld metal. The edges should be prepared to permit fusion without excessive melting. Care must be taken to keep heat loss due to radiation into the base metal from the weld to a minimum. A properly prepared joint will keep both expansion on heating and contraction on cooling to a minimum.

Diffusion bonding is a method of joining metallic or non-metallic materials. This bonding technique is based on the atomic diffusion of elements at the joining interface. Diffusion process actually is the transport of mass in form of atom movement or diffusion through the lattice of a crystalline solid. Diffusion of atoms proceeds by many mechanisms, such as exchange of places between adjacent atoms, motion of interstitial atoms or motion of vacancies in a crystalline lattice structure. The latest is the preferable mechanism due to low activation energy required for atom movement. Vacancy is referred to an unoccupied site in a lattice structure. Both diffusion and direct contact bonding are preferable bonding methods. Direct Contact/Fusion bonding occurs when the surface atoms are brought within atomic distances with the application of pressure and heat. Any surface contamination will inhibit bonding.

Diffusion bonding involves diffusion of atoms via a thermodynamic process where temperature and diffusibility of the material are considerable parameters. In general, the diffusion rate, in term of diffusion coefficient D, is defined as $D=D_o^{-Q/RT}$, where $D_o$ is the frequency factor depending on the type of lattice and the oscillation frequency of the diffusing atom. Q is the activation energy, R is the gas constant and T is the temperature in Kelvin.

The activation energy for atomic diffusion at the surface, interface and grain boundaries is relatively low compared to the bulk diffusion due to a looser bond of the atoms and higher oscillation frequency of the diffusing atom. This enhances the atomic diffusion, and thus eases the diffusion bonding of two metal pieces assuming that a perfect interface contact exists.

Since diffusion bonding is driven by the diffusion of atoms, diffusion bonding process can be used to bond dissimilar materials that are difficult to weld, such as, steel and copper alloys. When bonding metals together, direct contact/fusion and diffusion bonding causes micro-deformation of surface features, due to the pressure and temperature applied, which leads to sufficient contact on an atomic scale to cause the materials to bond. However, before the materials can be joined they undergo an extensive preparatory treatment.

The interface contact can be optimized by a treatment of the surface to be bonded through a number of processes, such as mechanical machining and polishing, etching, cleaning, coating, and material creeping under high temperature and loading.

All of the above-mentioned bonding methods are problematic due to the inability to prevent contaminants from adhering to the bond site surfaces. Surface contamination causes poor bond adhesion, resulting in less robust bonds and therefore less reliable interfaces. Accordingly, much effort has gone into cleansing the surfaces of metals prior to being bonded.

Low temperature plasmas of various ionized gases can be used to reactively etch/ash organic materials found on the surface of materials. In this procedure, typically the material is placed in an RF cavity with a flowing reactive gas. The nature of the gas selected is chosen based upon the desired effect. Oxygen or argon is generally used, however, specific gases ($CF_4$) may be used to tailor the reaction for the desired effect. By removing surface contamination, plasma cleaning increases the bonding or adhesive properties of the bondsite surface.

A plasma is a collection of positive, negative, and neutral particles wherein typically the density of the negatively charged particles is equal to the density of the positively charged particles. When an energetic electron strikes a neutral gas molecule, it can cause dissociation and form free radicals and ions. The free radicals cause chemical reactions for destroying contaminants. For example, with oxygen, the dissociation process produces the free radical atomic oxygen (O). This reactive species has enough energy to break a carbon-carbon bond. When the plasma gas is a mixture of hydrogen and argon, for example, the free radical atomic oxygen (O) can therefore combine with the hydrogen ($H_2$) into water ($H_2O$).

Prior art plasma cleaning involves placing the workpieces to be bonded into a plasma chamber, creating a vacuum within the chamber by pumping out all the air from the chamber, introducing a gas or gaseous mixture into the chamber, and energizing the gas in the chamber to produce the plasma. In the presence of the plasma, organic contaminants on the bondsite surfaces are converted to carbon monoxide, carbon dioxide, water vapor, and/or other gasses, which are pulled out of the plasma chamber by a vacuum pump. After a predetermined amount of time, the gas flow and energy are shut off, and the chamber is then purged with a nonreactive gas, such as nitrogen, to remove all traces of volatile compounds. Finally, the chamber is returned to atmospheric pressure. A cleaning cycle usually lasts from between 30 seconds to 15 minutes or more and is largely a function of the workpiece loading in the plasma chamber.

An important application of plasma cleaning is the removal of aluminum oxide (sapphire) from the surface of aluminum plates to allow diffusion bonding. Oxygen has such a strong affinity for aluminum that in a normal atmosphere, pure aluminum becomes oxidized in seconds, forming a few atomic layers of aluminum oxide on the surface, preventing aluminum-to-aluminum bonding. Plasma bathing of the metal plates reduces the surface aluminum oxide back to the original elemental aluminum, allowing bonding to take place.

Current metal diffusion methodologies have been unsuccessful for creating aluminum bonds, because of the difficulty of removing aluminum oxide chemically and because of the speed with which aluminum oxidizes. Further, the heating required to make the metal ductile enough to bond accelerates oxidation, which prevents bonding. With current, sequential, methods for cleaning, heating, and pressing bond surfaces, reoxidation prevents diffusion bonding of aluminum.

The current plasma cleaning methodology is problematic. First, immediately upon emerging from the plasma cleaning chamber, the cleaned workpiece(s) are re-exposed to surface contamination due to the organic particles in the air. In addition, the separate plasma cleaning chamber and equipment, coupled with the significant amount of time required to set up and execute the cleaning process, is quite costly.

It is therefore an object of the invention to provide a method for simultaneously heating, cleaning, and bonding materials together.

SUMMARY OF THE INVENTION

The present invention is a novel plasma enhanced bonding method and apparatus. The invention effectively generates a plasma bath, or "bubble", around the metal bonding surfaces of the plates to be bonded prior to and during the bonding action to thereby simultaneously heat, clean, and activate the surfaces of the materials that are to be bonded together, while the bonding is taking place.

In accordance with the invention, the plates to be bonded are positioned within close but non-contacting proximity to, and preferably in alignment with, one another. Prior to bonding the plates together at their respective bonding surfaces, hot plasma is applied in a pressurized directional modulated flow at and between the bonding surfaces of the plates to be bonded together to create a dynamic plasma cleaning chamber bubble. While continuing to apply the modulated plasma flow, the plates to be bonded are brought into contact within atomic distances of one another at their respective bonding surfaces. The mere positioning of the bonding surfaces of each plate within atomic distances of one another while within the dynamic plasma cleaning chamber bubble results in direct contact bonding. Preferably, additional sufficient pressure is applied over an appropriate amount of time with sufficient activation energy to achieve diffusion bonding of the plates with one another. Preferably, the activation energy is supplied via the temperature of the plasma and the pressure is supplied via an automated or manual press. The plasma flow and pressure are then removed, resulting in a robust plate-to-plate bond.

Preferably, the plasma cleans and activates the surface while heating the bonding surfaces to allow direct contact bonding to take place as the clean metal surfaces are pressed together such that at least some of the surface atoms are brought within atomic distances of one another, and without melting the bonding surfaces. This eliminates the need for an additional heating mechanism for heating the bonding surfaces.

In a particular application, the inventive process makes it possible to diffusion bond aluminum because the preparatory steps are done simultaneously with the bonding. This does not allow recontamination between the preparation of the surfaces and the bonding itself.

Accordingly, the present invention advantageously provides a novel technique that cleans the metal surfaces to be bonded as they are bonded to eliminate any contaminants from being introduced into the final bond, thereby improving the bond adhesion properties. The invention not only allows differing metals to be bonded together, but may also allow materials to be bonded together that prior to the present invention were difficult to bond due to contaminant compounds formed at the bond site, which resulted in weaker bonds. In addition to the above-named advantages, the temperature of the plasma/hot gas is high enough that the press need not include a heater. The invention essentially provides "localized" heating directed only at the bonding surfaces, thereby reducing the risk of damage to the plates to be bonded as well as to any components attached to the plates. The invention also makes possible the bonding of non-metallic materials such as sapphire, silicon, ceramic, and quartz materials in a similar manner. The direct contact bonding method only requires that the surface finish, temperature, and pressure are adequate for enough of the contact surface to be brought close enough together for the atoms from one surface to bond the atoms in the opposite surface while a modulated stream of intense plasma cleans, heats, and activates those surfaces as the contact happens.

BRIEF DESCRIPTION OF THE DRAWINGS

The invention will be better understood from a reading of the following detailed description taken in conjunction with the drawing in which like reference designators are used to designate like elements, and in which:

FIG. 9 is a cross-sectional side view of the cleaned plate of FIG. 8 after direct contact bonding with another plasma cleaned plate has occurred;

FIG. 10 is a cross-sectional side view of the direct contact bonded plate of FIG. 9 after some diffusion has occurred.

DETAILED DESCRIPTION

A method and apparatus for plasma enhanced bonding that supports the simultaneous heating, cleaning, and bond activation of the bonding surfaces of members to be bonded is achieved by maintaining the entire bond site in a dynamic plasma cleaning chamber bubble is described in detail hereinafter. Although the invention is described using certain preferred bonding materials, gaseous plasmas, and bonding apparatus configurations, it is to be understood that other bonding materials and gasses having similar bondability characteristics and other bonding apparatus configurations that achieve the same results are intended to be covered by the claims appended hereto.

Figure 7:
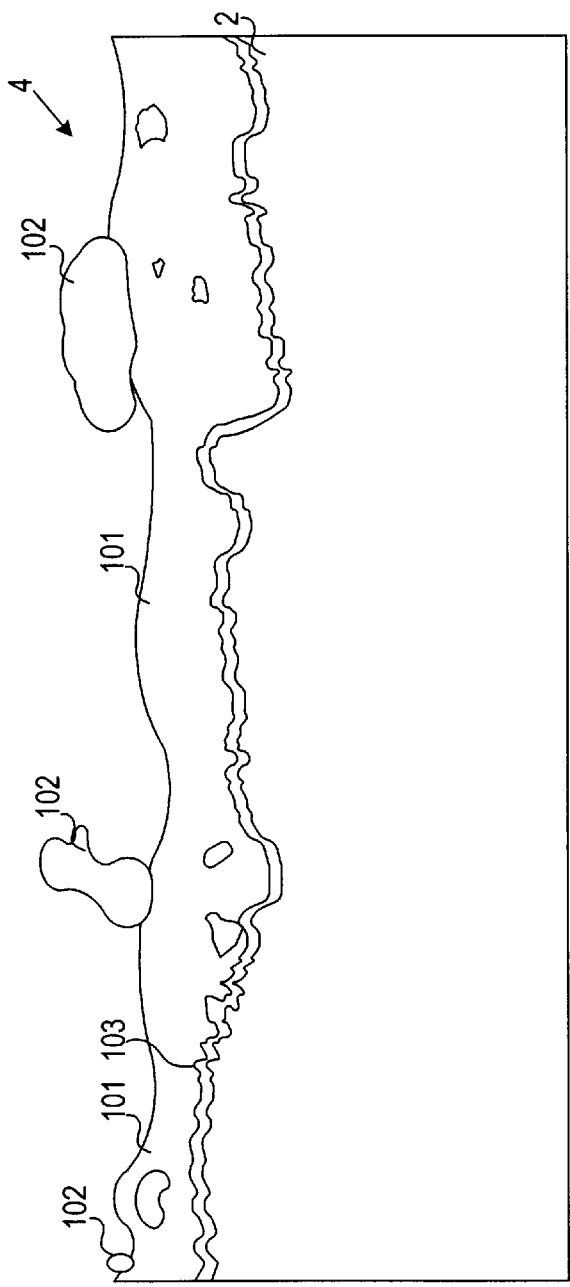
FIG. 7 is a cross-sectional side view of a contaminated plate to be bonded shown at the molecular level.

FIGS. 7–11 illustrate the principles effected by the invention. FIG. 7 is a cross-sectional side view of a portion of a contaminated plate 2 (e.g., aluminum) to be bonded shown at the molecular level. As illustrated, at the molecular level, the surface 4 of the plate is not smooth, but rather comprises a rough contour with surface variation on the order of 1000 nm. The variation at the surface finish is on the order of 200 nm. Surface 4 is contaminated by various contaminants, for example organic liquid 101 such as machining oil, solid contaminants 102 such as silica dust or epoxy, and oxides 103.

Figure 8:
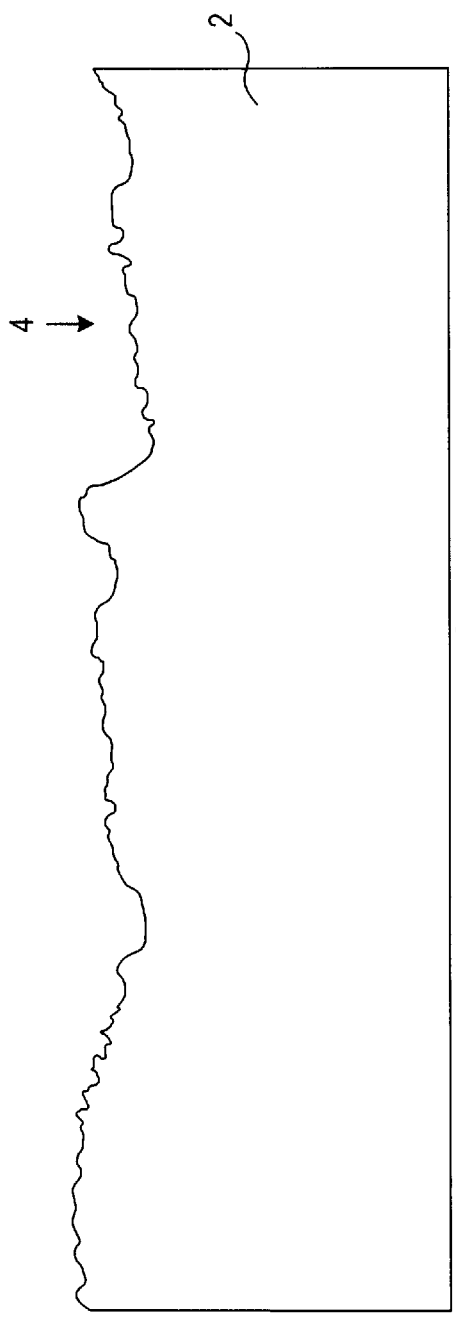
FIG. 8 is a cross-sectional side view of the plate of FIG. 7 after plasma cleaning has occurred.

After plasma cleaning, all of organic and inorganic contaminants are removed, as illustrated in FIG. 8. Once cleaned, direct contact bonding may occur with another cleaned plate, 8, as illustrated in FIG. 9. As shown, the cleaned surfaces 4 and 6 of the plates 2 and 8 form direct contact bonds 105 where the surfaces meet when compressed. Diffusion of the molecules near the surfaces 4 and 6 occur after additional time, pressure, and heating, as illustrated by the diffusion bonds 106 in FIG. 10. After sufficient time, pressure, and heating, full diffusion takes place, as illustrated in FIG. 12, to result in a perfect lattice structure.

Figure 1:
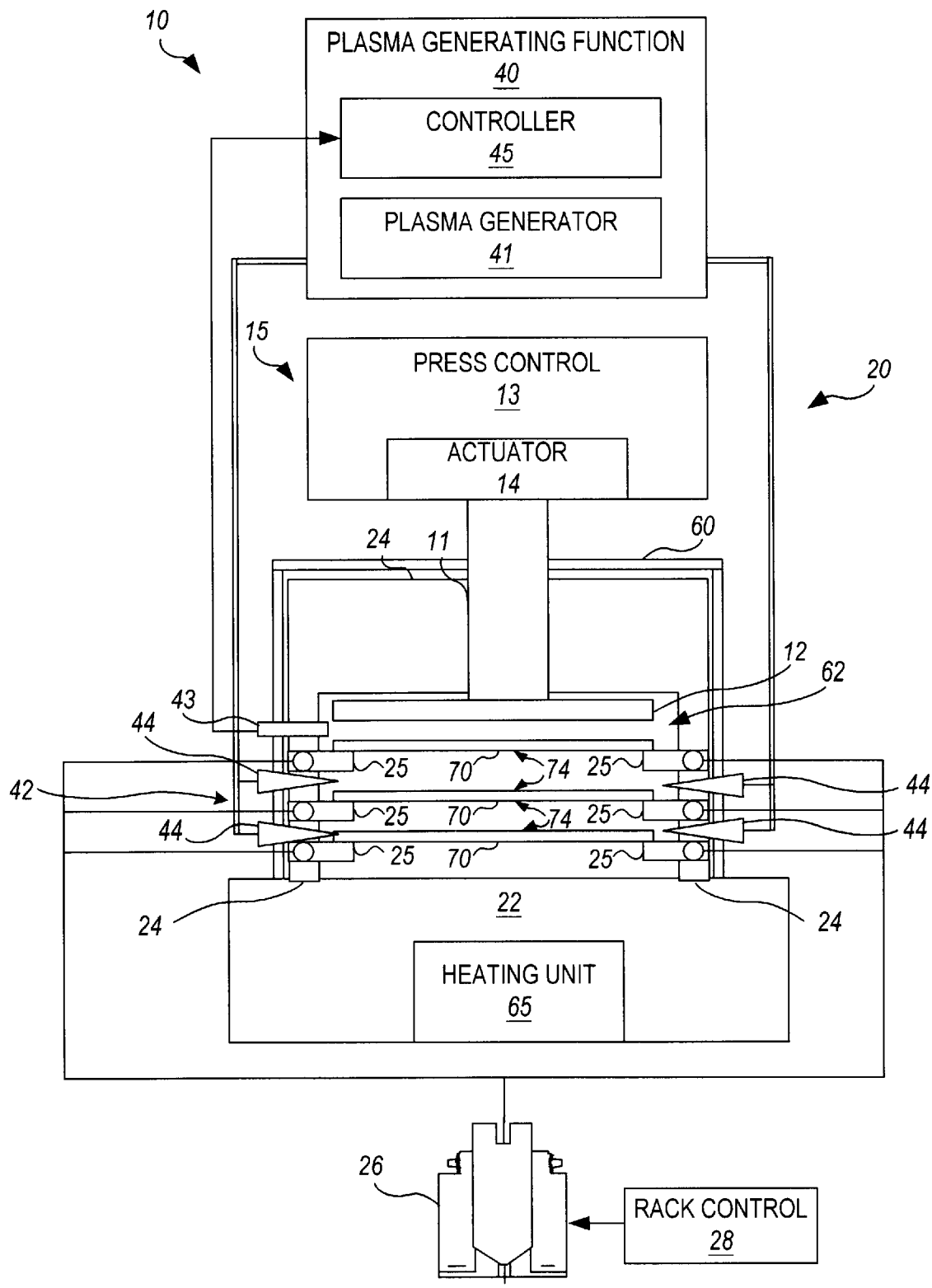
FIG. 1 is a block diagram of a plasma enhanced plate bonder implemented in accordance with the invention.

Turning now to FIG. 1, there is shown a plasma enhanced plate bonder 10 implemented in accordance with the invention. Plasma enhanced bonder 10 includes a bonding function 20 and plasma generator function 40. Bonding function 20 includes a chamber 62 enclosed by chamber walls 60. Chamber 62 may be heated by heating unit 65; however, depending on the application, plasma enhanced bonder 10 may be heaterless for reasons described hereinafter. Plasma enhanced bonder 10 operates to bond bondable materials, such as metals and certain non-metals, together. In the preferred embodiment, aluminum plates are bonded together.

Figure 2A:
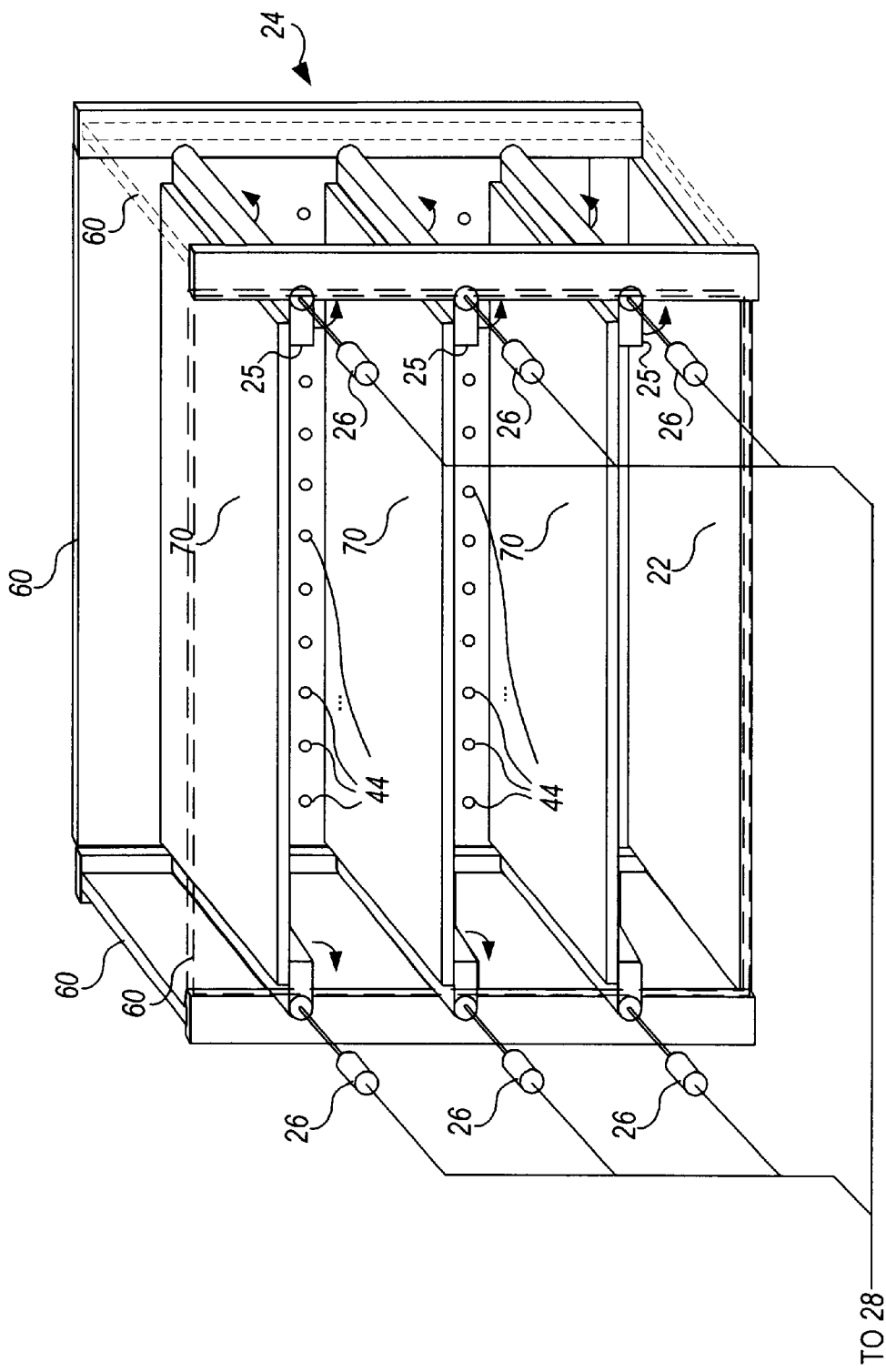
FIG. 2A is a perspective view of a preferred embodiment of a bonding apparatus used in the plasma enhanced plate bonder of the invention as viewed from one direction.
Figure 2B:
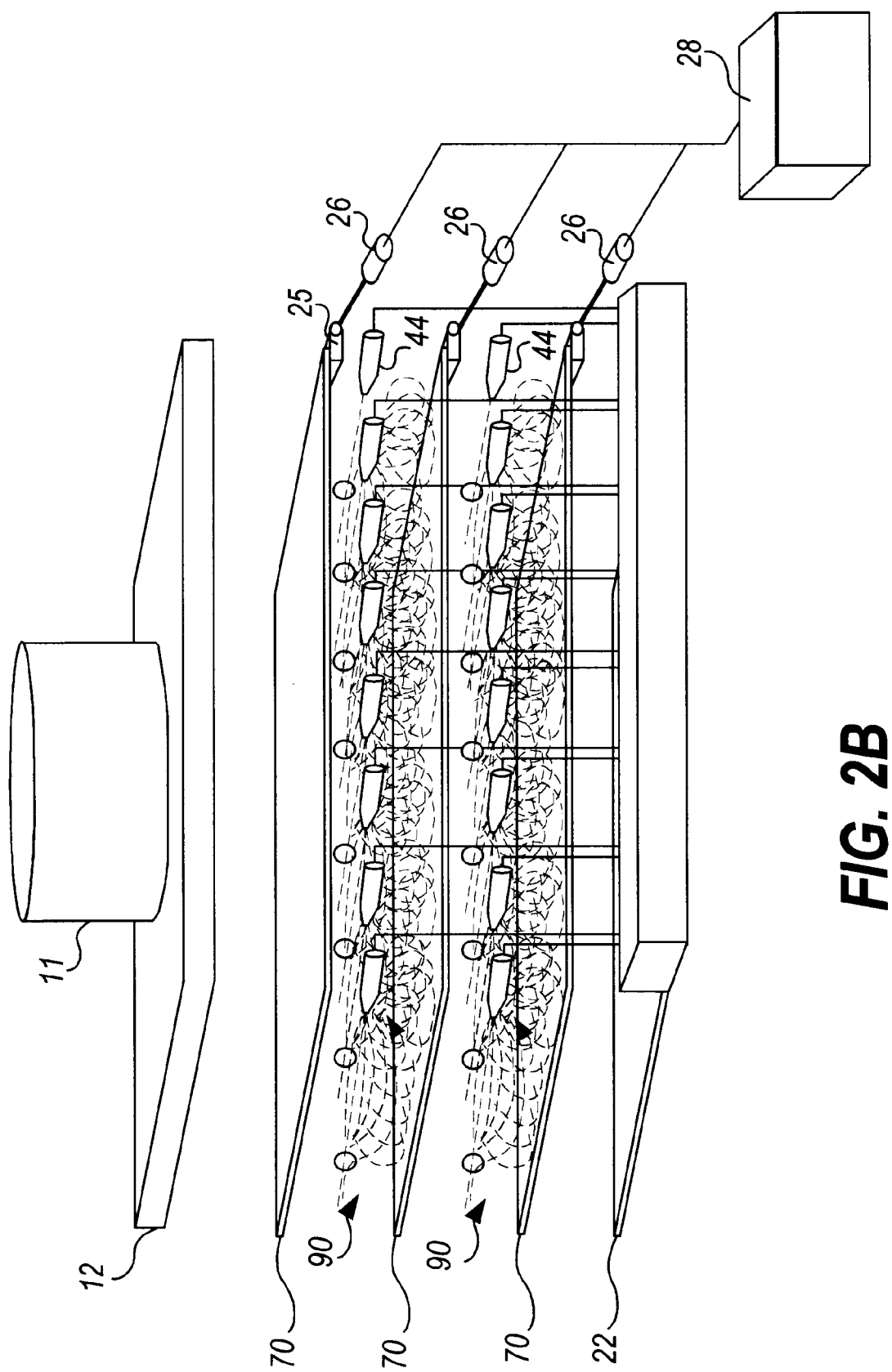
FIG. 2B is a perspective view of is a perspective view of a preferred embodiment of a bonding apparatus used in the plasma enhanced plate bonder of the invention as viewed from the opposite direction as that of FIG. 2A.

FIG. 2A and 2B illustrate a preferred embodiment of the bonding function 20 of FIG. 1. In this embodiment, bonding function 20 includes a base 22 and a rack 24 which supports a plurality of plates 70 each positionable thereon in a separated manner as shown. The rack 24 is controlled by a rack movement control mechanism 26 which preferably includes a solenoid which contracts and retracts the rack under the control of a rack controller 28. Rack 24 comprises a plurality of gripping members 25 which, when the rack 24 is in the contracted position, supports a portion of a plate 70. Rack 24 and gripping members 25 are preferably coated with a material such as diamond or sapphire. A given plate 70 is positioned on the contracted rack 24 with gripping members 25 supporting the plate 70 to separate it from the plates above and below it as shown. Each plate 70 comprises at least one bonding surface 74, preferably along the top or bottom plane of the plate as illustrated.

Bonding function 20 also includes a press 15. In the illustrative embodiment, press 15 is a hydraulic press; however, the principles of the invention equally apply to any type of press which exerts sufficient force on the plates 70 such that direct contact fusion/diffusion bonding occurs between the surface atoms of the bonding surfaces 74 of each of the plates 70. Such presses are well-known in the art and are intended to be included within the scope of the plasma enhanced circuit materials bonder 10. In the illustrative embodiment, press 15 includes an actuator 14 coupled directly or indirectly to a press armature 11 in a manner known in the art. Press armature 11 is coupled to a press foot 12 against which all contact force is applied.

Figure 3A:
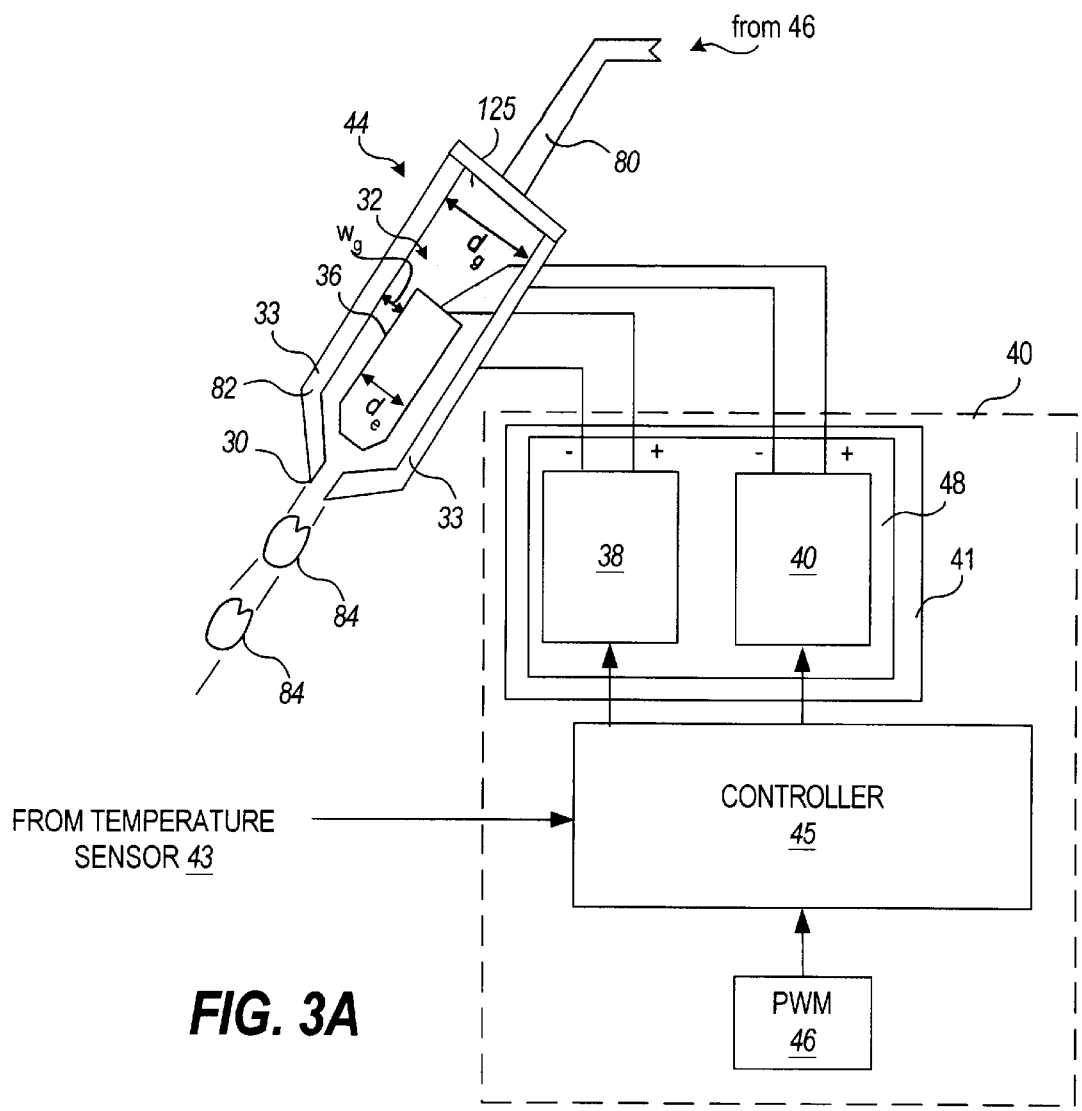
FIG. 3A is a side cross-sectional view of a preferred embodiment of the plasma gun used in the metal bonder of the invention.
Figure 3B:
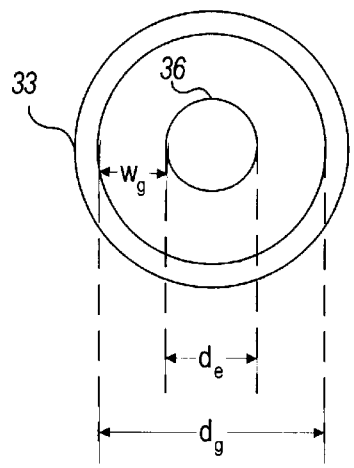
FIG. 3B is a concentric cross-sectional view of the preferred embodiment plasma gun of FIG. 3A.

Turning back to FIG. 1, plasma generating function 40 includes a plasma generator 41, a plasma gun array 42, a temperature sensor 43, and a controller 45. Plasma gun array 42 comprises a plurality of plasma guns 44 arranged in a linear array around the peripheral edges of the plates 70, as illustrated in FIGS. 1, 2A and 2B. The array 42 may be attached to the rack 24, or attached independently of the rack. In the preferred embodiment, each plasma gun 44, as shown in FIGS. 3A and 3B, comprises a hollow coaxial bore 32 through which a steady stream of gas 80 is supplied by a gas supply 46. In the preferred embodiment, gas 80 is a noble gas such as argon, which may optionally be a gaseous mixture such as 95% argon with 5% oxygen or hydrogen. Gas 80 is output from the plasma guns 44 between the bonding surfaces 74 as hereinafter described, forming a dynamic plasma cleaning chamber bubble 90 around the bonding sites, as illustrated in FIG. 2B. Gas 80 is pulse stimulated by an energizing circuit 48, which ionizes the gas to form hot plasma 82. Bore 32 is shaped aerodynamically to shoot a laminar stream of the hot plasma 82 through a tip 30 of the plasma gun 44 in a directional pressurized flow toward the bonding sites 74. The ions of the hot plasma recombine across the distance between the plasma gun tip 30 and the bonding sites 74 to form hot gas. The recombination is optional and is desirable merely to ensure that charge build-up does not occur on the surface of the device being bonded. The effect of the plasma and the hot reactant gasses (such as $H_2$ or $O_2$) is that the bonding surfaces 74 are simultaneously heated and cleaned immediately before and during the bonding step as described in more detail hereinafter.

In the preferred embodiment, gas 80 flows continuously through the bore 32 of the plasma gun 44 at the end of the coaxial bore opposite that of the tip 30 under the control of the plasma generator 41. Gas 80 is energized by energizing circuit 48 to form plasma 82. Energizing circuit 48 generates the energy to create the plasma, and is preferably generated either by a direct current voltage or by radio frequency in the range of 1 KHz to 100 GHz.

In the illustrative embodiment, energizing circuit 48 is implemented using a high voltage DC circuit 38 that sparks the initial ionization of the argon gas 80 within the plasma gun 44. A secondary low voltage DC circuit 40 continues the ionization of the gas once the initial ionization spark begins. The ionization of the gas 80 occurs periodically to form a periodic output stream of hot pulses (or "bullets") 84 of plasma. The temperature of the bond site is monitored using a temperature sensor 43 (FIG. 1) such as an infrared detector. Temperature sensor 43 is coupled to controller 45 which uses the data received from the sensor 43 to maintain the temperature at the desired level. Preferably, the temperature is high enough to allow direct contact fusion/diffusion bonding to take place to thereby eliminate the need for a heater as part of the bonding device (press). In the preferred embodiment, this temperature level is approximately 150° C., but in any case it is lower than the melting temperature of the plates 70 that are to be bonded together.

Figure 4:
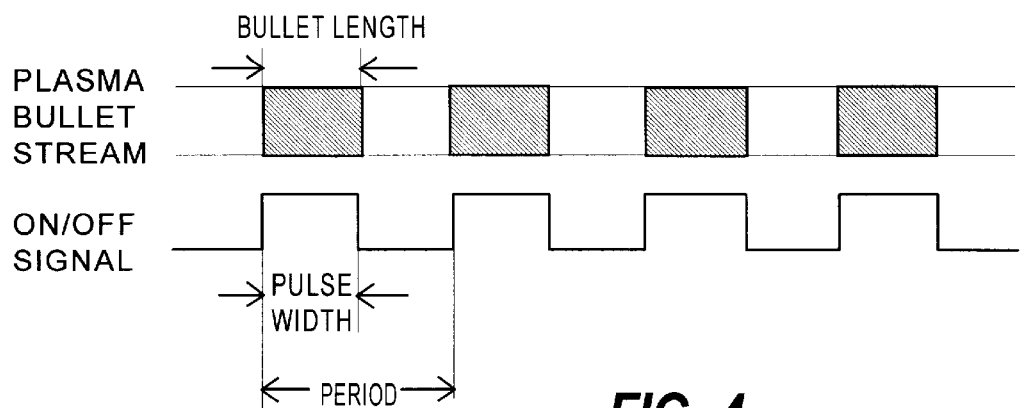
FIG. 4 is a graph illustrating the relationship between the frequency and duty cycle of the energizing circuit and the frequency and length of the plasma bullets.

The plasma bullets 84 are formed in the preferred embodiment by turning on and off the energizing circuit 48. The repetition rate and length of the plasma bullets 84 are controlled via controller 45, which preferably uses a pulse width modulator 46 to control the duty cycle of the energizing circuit 48 to maintain a peak energy that is high enough to guarantee heating and cleansing of the bonding surfaces. In the preferred embodiment, the frequency and length of plasma bullets 84 in the plasma stream is adjusted by design to fit the application. Furthermore in the preferred embodiment, the frequency and length of the plasma bullets is controlled according to temperature feedback from sensor 43. FIG. 4 is a graph illustrating the relationship between the frequency and duty cycle of the ON/OFF signal that controls the energizing circuit 48 and the frequency and length of the plasma bullets. As shown, the length of the plasma bullet is proportional to the width of the ON/OFF pulse in the on position. The frequency of the plasma bullets is directly related to the period of the ON/OFF signal.

It will be appreciated by those skilled in the art that since the array 42 of plasma guns 44 are aimed at the bonding site—namely the bonding surfaces 74 of the plates 70, the plasma bath 90, and therefore the cleaning and thermal heating, occurs only at the site of the surfaces to be bonded. This prevents damage to, and eliminates unnecessary cleaning of, the remaining portions of the plates 70 and any components attached thereto (not shown). The directional flow of plasma acts as a dynamic cleaning chamber 90 or "bubble" around the bond site, as illustrated in FIG. 2B, and once the bonding surfaces 74 are cleaned, the modulated plasma stream remains until the bonding is complete so that the outward flowing pressure from the gaseous bubble forces air out of the area of the bubble chamber and prevents air from re-entering the area enclosed within the bubble. Accordingly, the bonding surfaces 74 do not become recontaminated during the actual bonding. In operation, when the hot plasma bullets 84 come in contact with the surfaces to be bonded, they perform cleaning by performing one or more of the following actions, including vaporization, reduction, or oxidation, depending on the type of metals to be bonded and the gas or gaseous mixture chosen for the application.

When the gas or gaseous mixture contains a noble gas, such as argon, the noble gas molecules do not easily recombine with molecules containing other elements. Thus, when the noble gas molecules are heated to a high enough energy, the noble gas molecules operate only to break the bonds between surface contaminant molecules and the bond site molecules. This is due to the force of the hot (and therefore high speed) noble gas molecules when colliding with the surface contaminant molecules, which cause the surface contaminant molecules to break away from the bond site surface into free air. This operation is termed herein "vaporization".

When the gas or gaseous mixture contains a more recombinant gas, such as hydrogen ($H_2$), the recombinant gas molecules easily recombine with surface contaminant molecules. Thus, when the recombinant gas combines with surface contaminant molecules, the surface contaminants are converted, or reduced, to another form. For example, if the gas is a mixture of argon and hydrogen, and the surface contaminants are silicon dioxide ($SiO_2$), the hydrogen combines with the oxygen molecules to form water ($H_2O$) and oxygen, thereby reducing the surface contaminants to pure silicon (Si). This process is termed herein "reduction". The remaining surface contaminants can be vaporized by the noble argon gas molecules in the gaseous mixture as described above.

When the gas or gaseous mixture contains oxygen ($O_2$), the oxygen can combine with the surface contaminant molecules to "oxidize" or essentially "burn" away any contaminants present on the surfaces such as aluminum oxide.

In addition to cleaning, the plasma that forms the bubble chamber around the bond site simultaneously activates the bonds of the surface molecules at the bond sites so that surface molecules of both bonding surfaces 74 to be bonded together are activated to allow the same or different materials to more easily fuse together. In particular, the plasma/hot gas breaks the surface bonds of each of the respective bonding surfaces so that they are ready to rebond with the molecules of the other surface.

It will be appreciated that this novel technique of simultaneously cleaning the surfaces, activating the bonds of the surface atoms, and preventing contaminants from recontaminating the bonding surfaces during the bonding process allows metals that heretofore could not be bonded together to be bonded.

Figure 5:
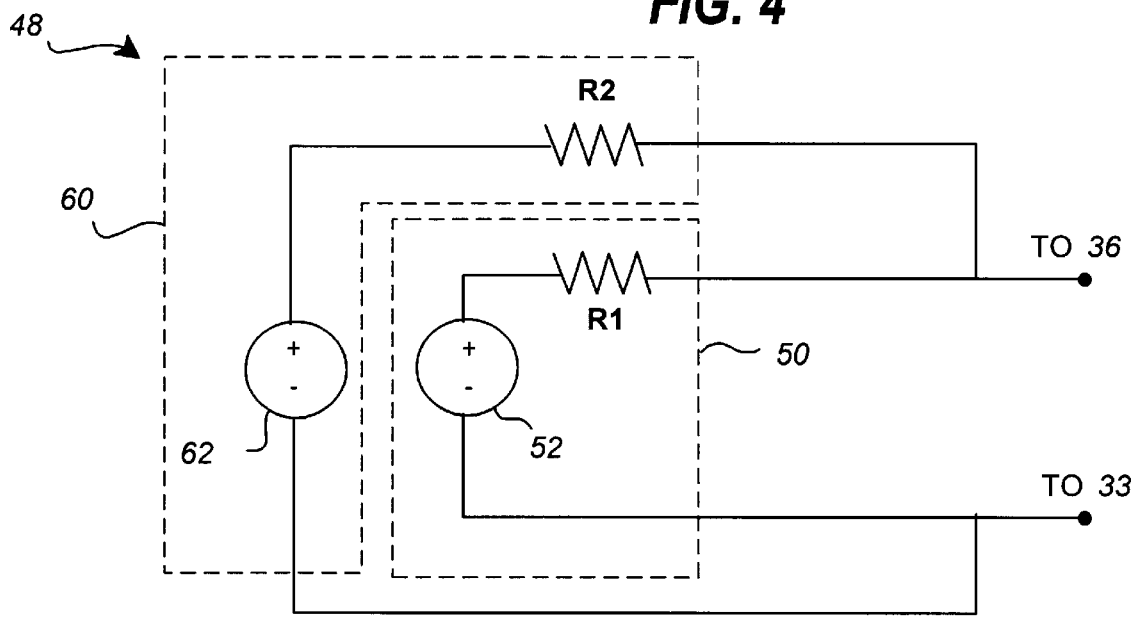
FIG. 5 is a schematic diagram of an illustrative embodiment of a plasma energizing circuit used in the metal bonder of the invention.
Figure 11:
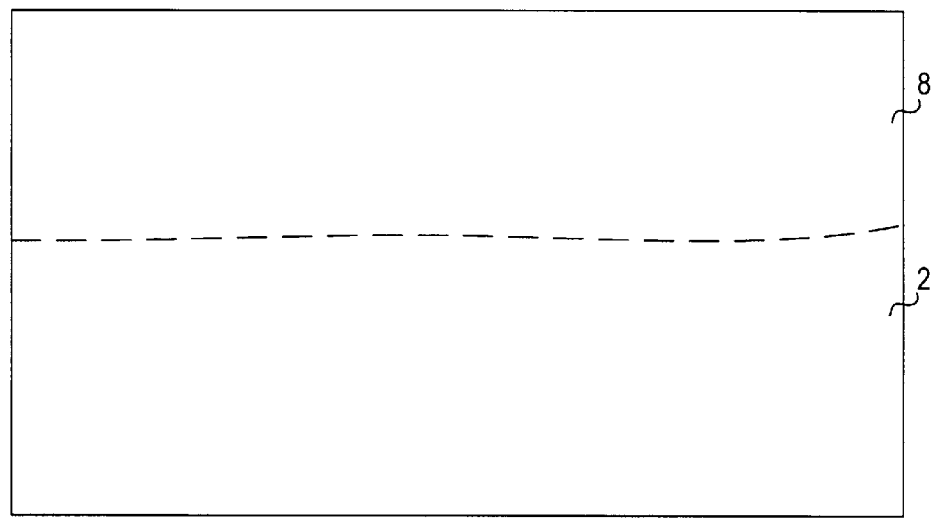
FIG. 11 is a cross-sectional side view of the plates of FIG. 10 after full diffusion bonding has occurred.

FIG. 5 is a schematic diagram of an illustrative embodiment of the plasma energizing circuit 48 that serves to ionize the argon to form hot plasma. In the illustrative embodiment, energizing circuit 48 uses direct current techniques to energize the gas, and includes an ionization initiation circuit 50 and a high-current circuit 60. Ionization circuit 50 is a high impedance/high voltage power supply which is schematically represented with a DC power supply 52 and a resistor R1. Referring back to FIGS. 3A and 3B, central electrode 36 has a diameter $d_e$ which is a predetermined length less than the diameter $d_g$ of the inner coaxial hollow bore 32. Electrode 36 is arranged coaxially within hollow bore 32, such that a hollow gap $w_g$ is formed concentrically and of even width around the electrode 36 along the coaxial axis. Gap width $w_g$ is defined by $d_g-d_e$, preferably at every point around the coaxial axis.

Referring back to FIG. 5, ionization circuit 50 is a high-voltage, low-current-limited series circuit, which yields high potential across the argon stream flowing through the hollow bore 32 between the electrode 36 and plasma gun walls 33. The design of the ionization is such that it delivers a high enough electric potential across the argon gap $w_g$ to result in ionization of the argon atoms as they pass through the gap. It will be appreciated by those skilled in the art that although ionization is achieved using a high-voltage, low-current-limited circuit, the temperature of the argon gas flowing out the tip 30 of the plasma gun and onto the surface of the bond site is still relatively low due to the limited power delivered to the gas across the gap $w_g$.

Accordingly, high-current circuit 60 is provided to maintain sufficient heat so as to allow the argon atoms to clean the surfaces of the bond site. In the illustrative embodiment, high-current circuit 60 is coupled in parallel with ionization circuit 50, and comprises a DC power supply 62 with a source impedance R2 (<<R1) between central electrode 36 and the outer wall 33 of plasma gun 44. High-current circuit 60 is a low-voltage power source which yields high power across the gap $w_g$ in which the argon stream flows through the hollow bore 32 between the electrode 36 and plasma gun walls 33. The high-current circuit 60 delivers lower voltage across the gap due to the drop in impedance of the ionized gas. This second power supply circuit 60 delivers the bulk of the energy to the gas.

As an illustrative example, if power supply 52 is a 20 KV DC supply initiates ionization and R1 is 1 Mohm (which limits the current to 20 mA). The resistance of the argon across the gap is large before ionization. However, now that the plasma has been ionized the lower voltage high current power supply can be initiated to supply the energy to create the working plasma. This ignition process is similar to using a low power flint spark to fire up a high energy output gas torch. Accordingly, the design of the high-current circuit 60 may be such that power supply 62 is an adjustable supply of approximately 5 to 40 V DC and R1 is near zero Ohms (which allows high output current limited only by the voltage supplied and the plasma resistance itself to Vapplied/Plasma Resistance). If the resistance across the gap is 2 ohms, and the power supply voltage is set to 20 volts then the plasma arc current is I=20/2, I=10 amps, then the power delivered across gap $w_g$ is $P=I^2*R=(10 A)^2*2 Ohms=200 W$, which is enough power to raise the temperature of the gas atoms to a level sufficient to perform surface cleaning and bonding. In actual practice the power delivered to the plasma will be set for each package and lid to obtain the optimum sealing bond without damaging the sealing metals or the surrounding circuitry. Once this peak power is set the final bonding temperature is set, as mentioned earlier, by monitoring the surfaces to be bonded with an IR temperature sensor between the "plasma bullets" and feeding this temperature back to the controller which adjust the pulse width modulator to maintain the optimum bonding surface temperature.

A critical factor in successful plasma cleaning is the choice of a process gas. If the correct gas is chosen, optimum contaminant removal is achieved, and the potential for undesirable substrate oxidation is minimized. Although the invention has been described using argon gas or an argon/oxygen mixture, other suitable gasses or gaseous mixtures may also be employed. Some other exemplary gases, such as hydrogen $H_2$ or carbon tetra-fluoride $CF_4$, possess desirable characteristics for plasma cleaning. Gas selection may vary according to cleaning requirements for a specific substrate, bonding metals, contaminant, application, or process.

In addition, various non-metal solid materials may also be bonded using the present invention (for example, glass to silicon, metal wire to fused quartz, sapphire to quartz).

Figure 6:
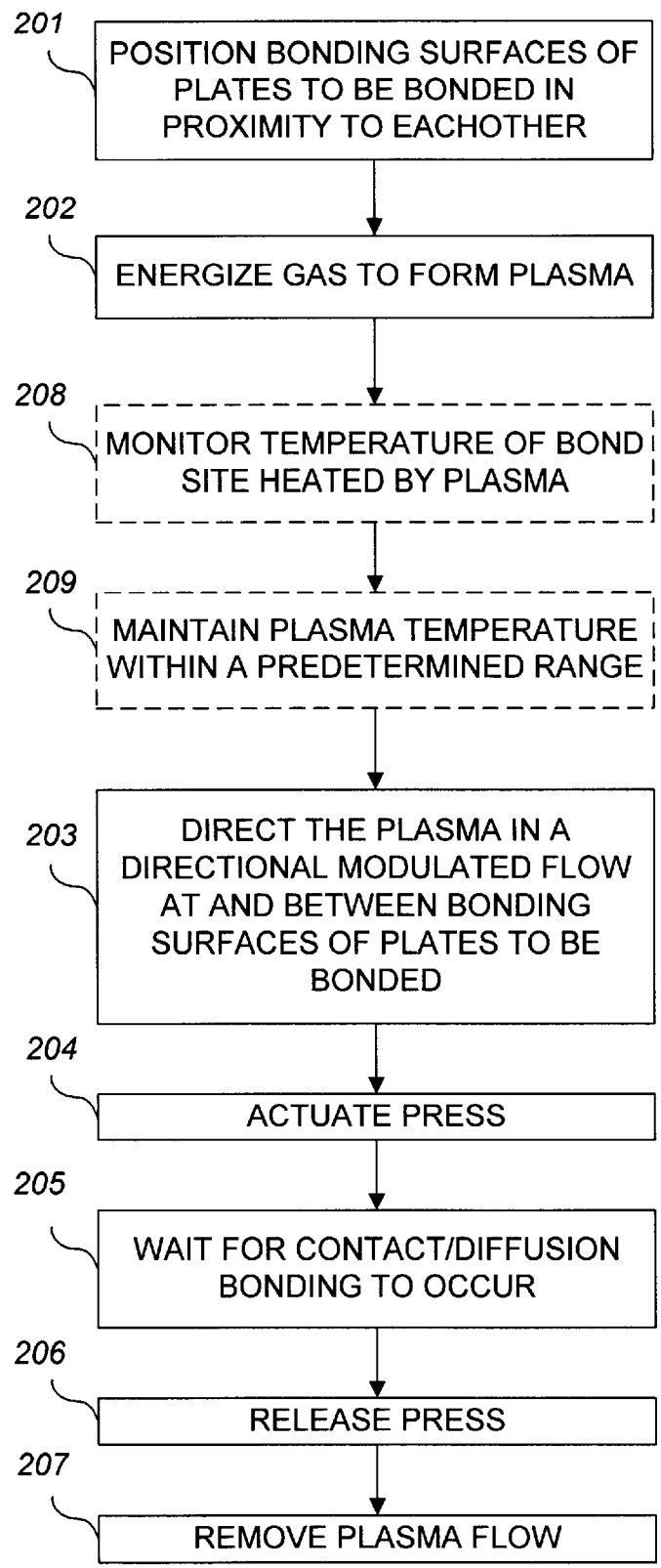
FIG. 6 is an operational flowchart of a method in accordance with the invention.

FIG. 6 is an operational flowchart of a method in accordance with the invention for simultaneously cleaning and bonding solid plates together. In accordance with the method of the invention, one or more plates 70 are placed with bonding surfaces in separated proximity to one another (step 201). In the preferred embodiment, this positioning comprises aligning the plates one on top of another in close separation on a rack. A gas is energized (step 202) to form a plasma. The plasma is directed (step 203) in a directional pressurized modulated flow at and between the bonding surfaces 74 of the plates to form a dynamic plasma cleaning chamber bubble around and between the bonding surfaces 74 of the plates 70. A press is then actuated (step 204) to compress the plates 70 together such that at least some of the surface molecules of each of the bonding surfaces 74 of the plates come within atomic distance with one another. Preferably, the plates are compressed together with sufficient force and with sufficient heat over sufficient time to allow full diffusion bonding to occur. Once bonding occurs (step 205), the press is released (step 206) and the plasma stream removed (step 207). Preferably, the temperature of the bond site heated by the plasma/hot gas is set to a predetermined temperature (e.g., a value within the range of 150° C. to 400° C.) and is monitored (step 208) and maintained (step 209) within a predetermined range (e.g., + or −10° C. of the predetermined temperature) so as not to melt or damage the underlying materials of the plates to be bonded.

The present invention as described in detail above is advantageous over the prior art in several respects. First, the bonding surfaces of the plates 70 are cleaned as they are bonded to eliminate any contaminants from being introduced into the final bond, thereby improving the integrity of the bond. Secondly, because the temperature of the bonding surfaces heated by the plasma/hot gas as it hits the surfaces to be bonded is high enough, the press device itself need not necessarily include a heater, thereby providing "localized" heating.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A plasma enhanced plate bonder, comprising:
   a plurality of plate supports which support a plurality of plates;
   a plate support controller operable to retract said plurality of plate supports to a retracted position which separates said plurality of plates, and to contract said plurality of plate supports to a contracted position which positions respective bonding surfaces of said plurality of plates in contact with one another; and
   a plasma generator which applies a modulated directional flow of plasma at and between said bonding surfaces of said plurality of plates when said plurality of plate supports are in said retracted position and during contraction of said plurality of plate supports by said plate support controller to said contracted position.

2. A plasma enhanced plate bonder in accordance with claim 1, comprising:
   a compression device which compresses said plurality of plates when said plurality of plate supports are in said contracted position.

3. A plasma enhanced plate bonder in accordance with claim 2, wherein:
   said compression device exerts a sufficient compression force over a sufficient amount of time to allow diffusion bonding to occur between said plurality of plates at said respective bonding surfaces.

4. A plasma enhanced plate bonder in accordance with claim 1, wherein said plasma generator comprises:
   one or more plasma guns which receive a gas from a gas supply and output said modulated directional flow of plasma through a plasma gun tip;
   an energizing circuit which ionizes said gas to form a plasma; and
   a controller which modulates said plasma as it exits through said plasma gun tip to generate said modulated directional flow of plasma.

5. A plasma enhanced plate bonder in accordance with claim 4, wherein:
   said controller maintains a temperature of a bond site within a predetermined temperature range, said bond site comprising said bonding surfaces of said plurality of plates.

6. A plasma enhanced plate bonder in accordance with claim 5, comprising:
   a temperature sensor which measures said temperature of said bond site; and
   wherein said controller is responsive to said measured temperature to adjust said modulated directional flow of plasma to maintain said temperature of said bond site within said predetermined temperature range.

7. A plasma enhanced plate bonder in accordance with claim 5, wherein:
   said predetermined temperature range is less than a melting temperature of said bonding surfaces of said plurality of plates.

8. A plasma enhanced plate bonder in accordance with claim 4, wherein:
   said controller maintains a temperature of a modulated directional flow of plasma within a predetermined temperature range.

9. A plasma enhanced plate bonder in accordance with claim 8, comprising:
   a temperature sensor which measures said temperature of said modulated directional flow of plasma; and
   wherein said controller is responsive to said measured temperature to adjust said modulated directional flow of plasma to maintain said temperature of said modulated directional flow of plasma within said predetermined temperature range.

10. A plasma enhanced plate bonder in accordance with claim 9, wherein:
    said predetermined temperature range is less than a melting temperature of said bonding surfaces of said plurality of plates.

11. A method for bonding respective bonding surfaces of a plurality of plates, comprising:
    supporting said plurality of plates on a plurality of plate supports, said plurality of plate supports positioned in a retracted position which separates said respective bonding surfaces of said plurality of plates from one another;
    contracting said plurality of plate supports to a contracted position which positions respective bonding surfaces of said plurality of plates in contact with one another; and
    applying a modulated directional flow of plasma at and between said bonding surfaces of said plurality of plates when said plurality of plate supports are in said retracted position and during contraction of said plurality of plate supports to said contracted position.

12. A method in accordance with claim 11, comprising:
    compressing said plurality of plates when said plurality of plate supports are in said contracted position.

13. A method in accordance with claim 12, comprising:
    exerting a sufficient compression force over a sufficient amount of time to allow diffusion bonding to occur between said plurality of plates at said respective bonding surfaces.

14. A method in accordance with claim 11, comprising:
    receiving a gas from a gas supply;
    ionizing said gas to form a plasma; and
    modulating said plasma to generate said modulated directional flow of plasma.

15. A plasma enhanced plate bonder in accordance with claim 14, comprising:
    maintaining a temperature of a bond site within a predetermined temperature range, said bond site comprising said bonding surfaces of said plurality of plates.

16. A method in accordance with claim 15, comprising:
   measuring said temperature of said bond site; and
   adjusting said modulated directional flow of plasma based on said measured temperature to maintain said temperature of said bond site within said predetermined temperature range.

17. A plasma enhanced plate bonder in accordance with claim 16, wherein:
   said predetermined temperature range is less than a melting temperature of said bonding surfaces of said plurality of plates.

18. A plasma enhanced plate bonder in accordance with claim 14, wherein:
   maintaining a temperature of a modulated directional flow of plasma within a predetermined temperature range.

19. A plasma enhanced plate bonder in accordance with claim 18, comprising:
   measuring said temperature of said modulated directional flow of plasma; and
   adjusting said modulated directional flow of plasma based on said measured temperature to maintain said temperature of said modulated directional flow of plasma within said predetermined temperature range.

20. A method in accordance with claim 19, wherein:
   said predetermined temperature range is less than a melting temperature of said bonding surfaces of said plurality of plates.

* * * * *